Oct. 8, 1957  J. M. GARCES  2,808,711
PORTABLE AIR COOLER
Filed July 17, 1956  3 Sheets-Sheet 1
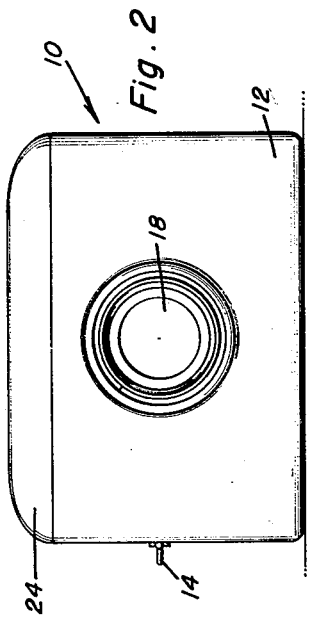
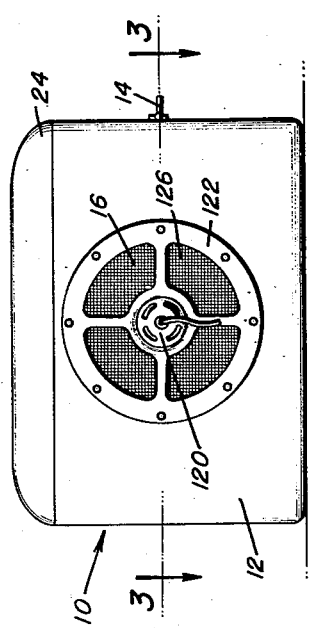
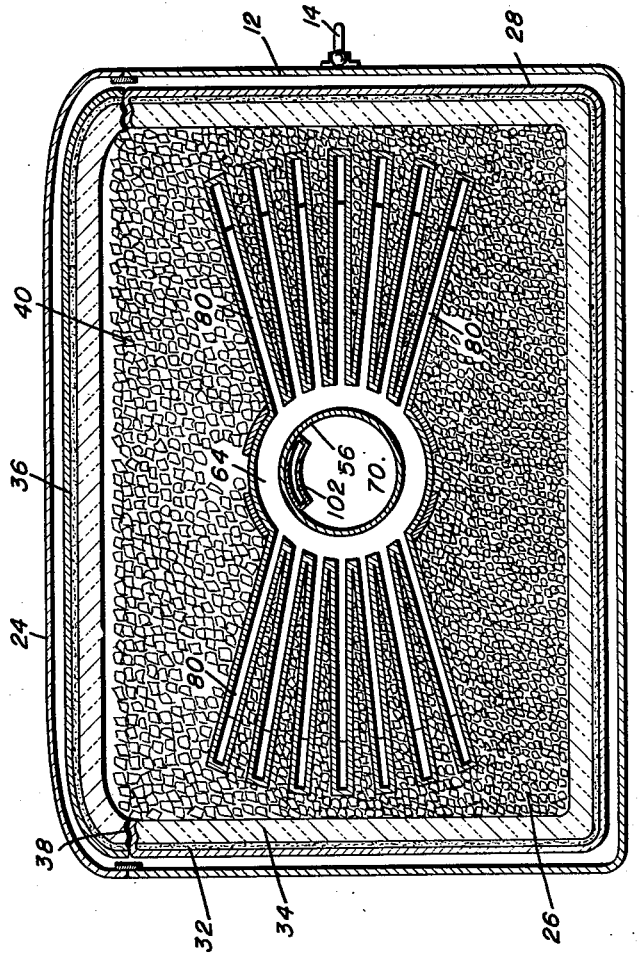
Julio M. Garces
INVENTOR.

Oct. 8, 1957   J. M. GARCES   2,808,711
PORTABLE AIR COOLER
Filed July 17, 1956   3 Sheets-Sheet 2

Julio M. Garces
INVENTOR.

BY *Clarence A. O'Brien*
*and Harvey B. Jacobson*
Attorneys

Oct. 8, 1957 J. M. GARCES 2,808,711
PORTABLE AIR COOLER
Filed July 17, 1956 3 Sheets-Sheet 3
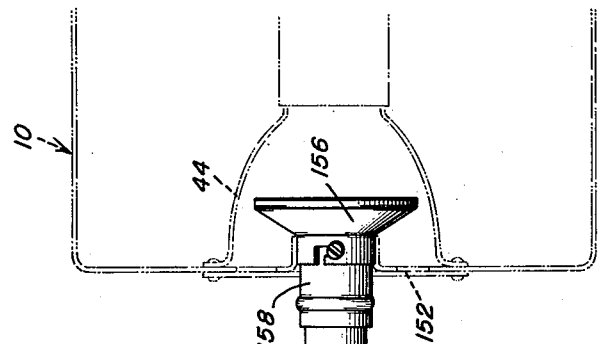
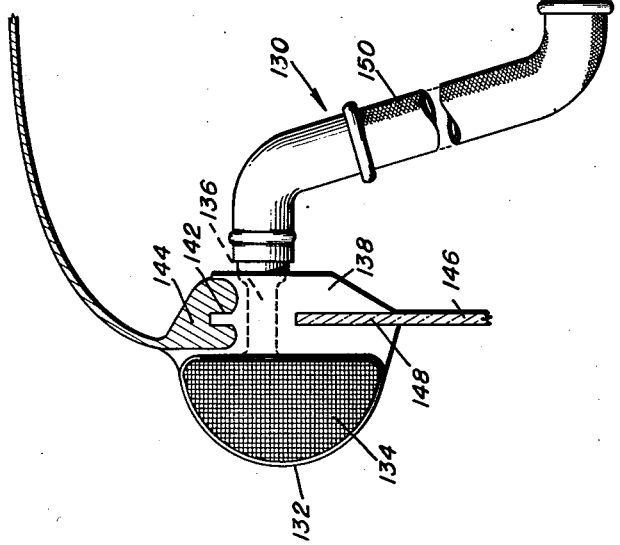
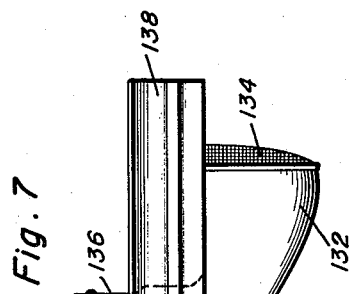
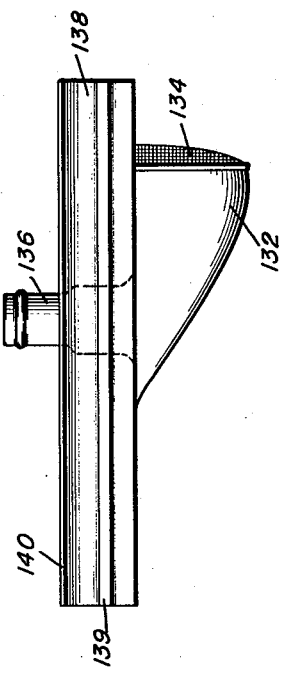
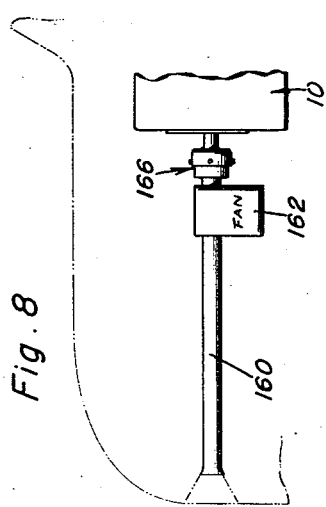
Julio M. Garces
INVENTOR.

United States Patent Office 2,808,711
Patented Oct. 8, 1957

2,808,711

PORTABLE AIR COOLER

Julio M. Garces, New York, N. Y.

Application July 17, 1956, Serial No. 598,410

10 Claims. (Cl. 62—131)

This invention relates to a portable air cooling device and more particularly to a portable air cooler which is convertible from a room air conditioner to an automobile air cooler.

An object of the present invention is to provide a convertible air cooler which is of simple mechanical construction and which is practical for use either as a room air cooler or a motor vehicle air cooler, there being only a very simple alteration required to adapt the air cooler to either of these uses.

A further object of the present invention is to provide improvements in the means in the cooling chamber for cooling the air stream as it is propelled from a warm air inlet to the cooled air outlet of the device. This is accomplished by having a cooling air tank located in the refrigerant chamber and, in addition to the cooling air tank, a reservoir tank arranged to bleed air into the warm air as it is withdrawn from the surrounding atmosphere, whereby it is precooled. In addition, the reservoir tank is arranged to deliver a part of its air supply to the inlet air as it passes through the throat of the air conducting means in the air conditioning device.

A further object of the present invention is to provide a portable room or automobile air cooler which preferably, but not necessarily, utilizes ice in a refrigerant chamber to cool air propelled through the chamber but isolated from the refrigerant, this being achieved by having what is considered to be a novel system and network of air conducting conduits, throat, tanks and lines arranged to provide a very high degree of satisfaction in cooling the air as it flows through the room air conditioner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the room or automobile air inlet side of a portable air conditioner or cooler made in accordance with the invention;

Figure 2 is an elevational view of the opposite side of the portable air cooler of Figure 1;

Figure 4 is a transverse sectional view taken on the line 4—4 of Figure 3;

Figure 6 is an elevational view showing partially schematically and partially in section the manner of applying an attachment to the air cooler of Figure 1 in order to convert the air cooler into an automobile air conditioner;

Figure 7 is a top view of the air scoop and means to attach the air scoop to the motor vehicle, these being illustrated in Figure 6;

Figure 8 is a schematic representation showing a further suggested manner of attachment of the air conditioner to a motor vehicle;

Figure 9 is an elevational view of a coupling illustrating a further modification in the manner of attachment of the cooler in a motor vehicle.

Figures 3, 5:
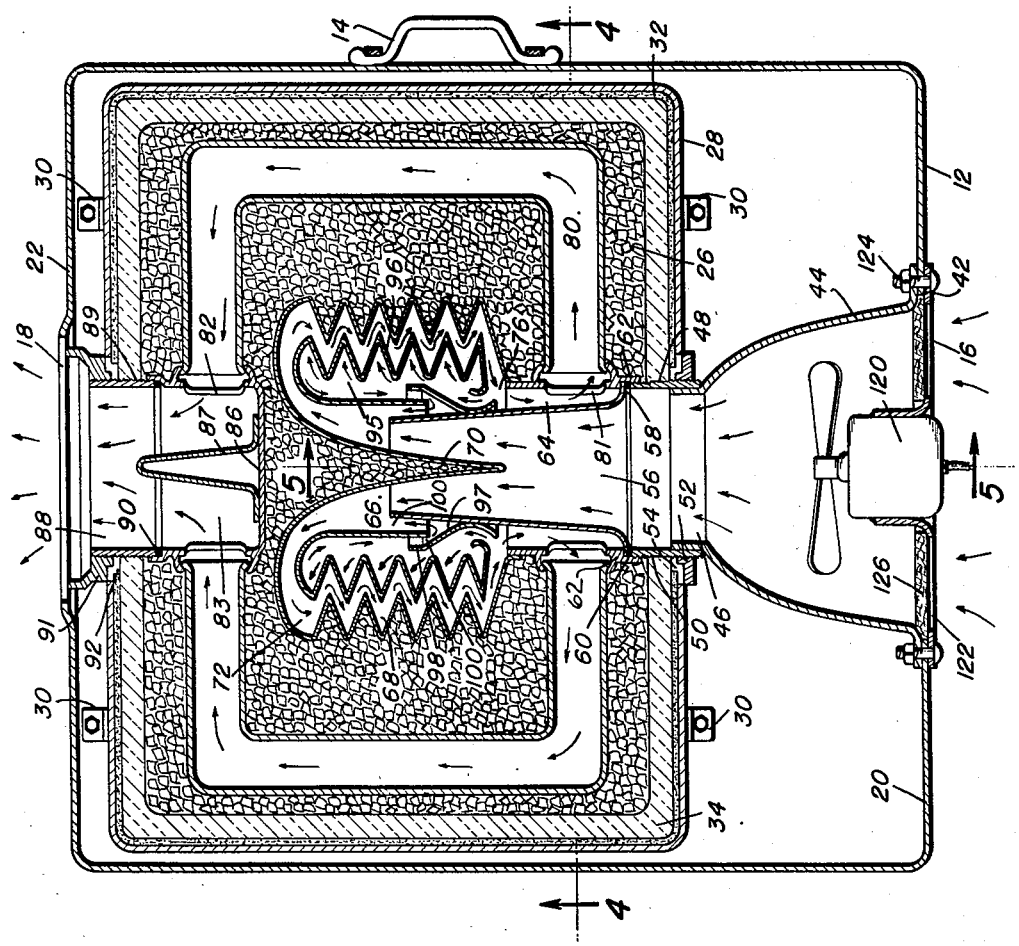
Figure 3 is an enlarged sectional view taken approximately on the line 3—3 of Figure 1.
Figure 5 is a fragmentary sectional view showing a part of the air circulatory system of the air cooler.

In the accompanying drawings there is a portable air cooler 10 constructed in accordance with the invention. The air cooler is made of a housing 12 having a handle 14 to facilitate carrying from one place to another. Housing 12 has a warm air inlet 16 and a cooled air outlet 18 in walls 20 and 22 thereof. The top of housing 12 is open with hinged cover 24 being located thereon to facilitate entry to the refrigerant chamber 26. This chamber is formed by casing 28 which is bolted or otherwise attached to housing 12. In order to derive maximum insulation value from the housing 12, the casing 28 may be supported therein by means of a number of small brackets 30 which hold the casing 28 spaced from all of the walls of the housing. A liner of insulating material, as cork liner 32, is disposed in casing 28. A different insulation 34 is placed on the cork liner 32 and may be of fiber glass, refractory material or other high insulating value substance. Closure 36 for the casing 28 has a similar arrangement of insulating layers and is held fast in place by means of quick disconnect latches arranged to pull the closure 36 tightly on gasket 38 located between the upper edge of casing 28 and the confronting edge of the closure 36. Crimped surfaces on the confronting edges provide for a better seal between the closure 36 and the casing 28.

Although other refrigerants may be used in refrigerant chamber 26, successful operation has been obtained with crushed or cubed ice 40. Accordingly, ice is illustrated as being a possible refrigerant.

The warm air inlet 16 is formed by an aperture 42 in wall 20 of housing 12, behind which there is an air cup 44 with an open end in registry with aperture 42 and an opposite open end 46 fitted in collar 48. This collar is externally threaded and disposed in opening 50 formed in a wall of the casing 28. Nut 52 is located on collar 48 and holds a compressible seal 54 packed tightly in a stepped seat formed in the casing wall. Throat 56 is in registry with collar 48 and has a flange 58 at one end seated on gasket 60 at the inner extremity of the collar. Nut 62 holds the flange 58 tightly assembled on gasket 60 and is formed as a part of sleeve 64. Throat 56 is in the form of a converging nozzle and functions as such in delivering air into annular inlet 66 of cooling air tank 68. Cooling tank 68 has a corrugated side wall in order to present as large an area as possible to the refrigerant in chamber 26. A generally conical baffle 70 proceeds inwardly of the throat 56 and inlet 66 in order to assure smooth flow into the annular entrance 72 of cooling tank 68. The cooling tank has an annular discharge end 76 which opens into collar 64, the latter functioning as a manifold feeding a plurality of flat air conducting tubes 80. Each tube 80 is substantially U shaped and is preferably flat in cross section. There is an inlet end for each tube 80, the inlet end being in registry with an opening, for example, opening 81 (Figure 3), in the collar 64 and having its opposite end in registry with an opening, for example, opening 82, in the collar 83.

Collar 83 is in registry with the discharge outlet 18 for the cool air and has a closed inner wall 86. This inner wall is provided with a conical baffle 87 for flow straightening purposes and has a group of openings 82 in its side wall. Each of the openings 82 is in registry with the outlet end of one of the tubes 80, the latter being embedded in the ice refrigerant.

An externally threaded collar 88 is located in an opening 89 formed in casing 28 and is threaded onto collar 83, there being a gasket 90 between these two members in order to make them liquid and air tight. Annular nut 91 is also threaded on the collar 89 and compresses a gasket 92 in a stepped seat in opening 89.

As the air passes through cup 44 and into throat 56, it discharges through sleeve 66 and into the cooling air tank 68. Thereafter, it passes through the discharge end 76 of this cooling tank and into the collar 64. Then, it issues through the tubes 80 and ultimately passes through the outlet 18. During this course of procedure, some of the air in passing through the discharge end 76 of tank 68 passes into a reservoir tank 95 having the wall 96 which is preferably corrugated in the same manner as the previously mentioned wall of tank 68 and practically concentrically arranged therewith. This reservoir tank stores some of the cooler air in the air cooler in order to be applied into sleeve 66 at approximately the point of entry of the air from throat 56. This is achieved by having collar 97 fitted on the throat 56 with a bell mouth 98 at one end sufficiently wide to provide an air passage 100 between it and the wall of sleeve 66. Accordingly, as shown by the arrows in Figure 3, a smaller stream of cooler air from the reservoir tank 95 is admixed with the main stream passing through throat 56. In effect, some of the air which passes through the cooling air tank 68 is recirculated through the reservoir tank.

An additional quantity of this cool air from the reservoir tank 95 is passed through bleed line 102 (Figure 5) in the form of a small air duct 104 which opens into the air stream at the discharge end 76 of the cooling air tank 68 and which extends practically to the mouth of cup 44 where it terminates in nozzle 106 directed radially of the cup. This, also, is for precooling the air in the main inlet air stream. Precooling is also achieved by having the throat 56 in heat exchange relationship to the reservoir tank 95 and collar 97. Although the duct 104 may be made in many ways, flat tubing connected by soldering or other means to the throat 56 and cup 44 is effective.

When being used as a room air conditioner, motor 120 mounted in the cup 44 is suggested. This motor has an electrical cord and switch and drives a propeller preferably located in the cup 44. An apertured mounting plate 122 which supports motor 120 is bolted as at 124 to the housing 12. An air filter 126 is attached to the plate 122. In using the air cooler as a device to reduce the air temperature in a room or other stationary enclosure, the casing 28 is filled with a refrigerant, preferably ice, completely covering the tubes and the cooling tank 68. Casing 28 and housing 12 are closed and the electric motor is energized. This will draw a stream of room air through the filter 126 and into the air chamber which includes cup 44. The air is passed into the throat 56 and from there passes through tank 68 which is the principal heat exchange device for cooling the air. Thereafter, it passes through the discharge end at 76 thereof, into the group of tubes 80 for admission into the outlet collars in longitudinal alignment with the cooled air outlet 18. The cooling process commences as the air travels through collar 48 and throat 56. There will be a marked cooling of the air stream as it travels through the main cooling air tank 68 and the reservoir tank 95. As the cool air leaves the cooling tank 68 and comes in contact with collar 97, a certain amount of air will strike the collar 97 in order to divert it into the reservoir tank 95, but with a diminished force. The unreflected cool air stream will travel through the tubes 80 as described previously. When going through these tubes, the air is further cooled prior to its discharge through outlet 18.

The importance of the reservoir tank 95 is emphasized at this time. The above mentioned deflected cool air tends to accumulate and be temporarily held in the reservoir tank 95. A constant air stream deflected in this manner will cause an overflow of cool air so that it returns for admixing with the main air stream as this main air stream enters the sleeve 66. As the fresh air stream leaves the throat and passes into the tank, a suction is formed in the space between the reservoir tank and the throat, and it is this suction that will draw in the cool air overflow which mixes and immediately cools the freshly drawn air into the cooling tank. This movement causes a continuous circulatory cool air stream path in the cooling tank to the reservoir tank and back to the cooling tank. There will also be an uninterrupted flow of the undeflected cool air stream through the plurality of pipes 80. A certain amount of this cool air escapes through the bleed line 102 and is aided by the blower driven by motor 120 to be mixed with the main inlet air stream for precooling the same.

In order to convert the room air cooler to a motor vehicle attachment for cooling the interior thereof, motor 120 and its mounting plate 122 are removed. In their place there is an attachment 130 (Figure 6) applied to the air cooler. This attachment consists of an air scoop 132 having a filter 134 in the inlet thereof and having a nipple 136 connected therewith. This nipple passes through a yielding material body 138 which may be made of rubber or plastic. The upper surface of body 138 is formed with ribs 139 and 140 which fit in the groove 142 of channel 144 of the motor vehicle window. This channel normally accommodates the window 146, keeping the upper edge of the window weather tight. The lower part of the body 138 has a slot 148 to accept the upper edge of the window 146, thereby holding the air scoop 132 and its body 138 firmly in place on the motor vehicle. Any of the vertically moving windows of the motor vehicle may be selected to accommodate the air scoop structure.

Hose connections 150, capable of conducting air, are connected to nipple 136 and it is preferred that one or more of the hoses in the hose assembly be flexible to facilitate the positioning of the air conditioner in a convenient place in the motor vehicle. Mounting plate 152, which is substantially identical to mounting plate 122, is bolted or otherwise attached in registry with the inlet 16 of the air cooler 10. This mounting plate has a divergent nozzle 156 supported by it and in which a filter may be accommodated. A quick disconnect coupling 158 is attached to one of the hoses of the hose assembly and to the divergent nozzle 156. Accordingly, attachment 130 constitutes a means for delivering air under pressure into the air cooler, as does the motor 120 and its associated structure.

Alternate means for delivering air under pressure to the air cooler may be resorted to without departing from the invention. For example, Figures 8 and 9 depict another suggested installation. Here, the motor vehicle is provided with an air duct 160, this being standard equipment for the motor vehicle and a part of the heater and defrost arrangement. Also included is the fan casing 162 with which air cooler 10 is operatively connected by means of coupling 166. This coupling is in the form of a flexible bell 168 attached by suitable means, as suction cups 170, onto the outer surface of the discharge conduit 176 from fan casing 162. In this type of installation, the defroster and/or fresh air inlet distributor in the motor vehicle is removed or at least disconnected in order to accept bell 168. Air delivered from the fan casing 162 passes through coupling 166 and an air conduit 180 which is arranged in registry with the inlet of the air cooler 10. This may be by way of a diverging nozzle identical to that shown in Figure 6 or by other attachments.

Except for the use of the heater and/or defrosting equipment of a motor vehicle or the attachment 130 as a source of inlet air under pressure, the operation of the air cooler in a motor vehicle is identical to the operation described previously in connection with room air conditioning. In each instance, however, replenishment with fresh refrigerant may be accomplished by first removing the accumulated water in the retaining tank with a syphon or other device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible automobile and room air conditioner comprising a housing having a warm air inlet and a cool air outlet, a refrigerant chamber in said casing, a throat in said chamber and in communication with said inlet, a cooling air tank in said chamber and air tubes establishing an air path from said throat to said outlet, an air reservoir tank in said chamber and arranged to deliver cool air into said cooling air tank prior to discharge into said tubes.

2. A convertible automobile and room air conditioner comprising a housing having a warm air inlet and a cool air outlet, a refrigerant chamber in said casing, a throat in said chamber and in communication with said inlet, a cooling air tank in said chamber and air tubes establishing an air path from said throat to said outlet, at least a part of said cooling tank being in heat exchange relationship with said throat in order to precool the air as it passes through said throat.

3. A convertible automobile and room air conditioner comprising a housing having a warm air inlet and a cool air outlet, a refrigerant chamber in said casing, a throat in said chamber and in communication with said inlet, a cooling air tank in said chamber and air tubes establishing an air path from said throat to said outlet, a cool air bleed line extending from said reservoir tank to a point downstream of said warm air inlet and upstream of said throat in order to precool the inlet air.

4. The convertible air conditioner of claim 3 wherein there are means in said warm air inlet to supply air under pressure.

5. A device for cooling air in an enclosure, said device comprising a housing, a casing disposed in said housing, means insulating the walls of said casing, a refrigerant chamber in said casing, an air inlet in said housing and said casing, means including a converging throat arranged to deliver air into said casing, a cooling air tank having an inlet adapted to be fed with air from said throat and an outlet through which the cooled air is adapted to pass, a plurality of tubes in said chamber and exposed to the refrigerant therein, a manifold having the inlet end of each tube operatively connected with it and arranged in registry with the outlet end of said tank, said tubes having outlet ends in registry with the outlet for cooled air.

6. A device for cooling air in an enclosure, said device comprising a housing, a casing disposed in said housing, means insulating the walls of said casing, a refrigerant chamber in said casing, an air inlet in said housing and said casing, means including a converging throat arranged to deliver air into said casing, a cooling air tank having an inlet adapted to be fed with air from said throat and an outlet through which the cooled air is adapted to pass, a plurality of tubes in said chamber and exposed to the refrigerant therein, a manifold having the inlet end of each tube operatively connected with it and arranged in registry with the outlet end of said tank, said tubes having outlet ends in registry with the outlet for cooled air, a cooled air reservoir tank within said cooling air tank, means arranged between said tanks to divert a part of the air stream passing through the discharge end of said cooling tank into said reservoir tank, and means for conducting air from said reservoir tank into the main air stream as it leaves said throat for re-entry into said cooling air tank.

7. A device for cooling air in an enclosure, said device comprising a housing, a casing disposed in said housing, means insulating the walls of said casing, a refrigerant chamber in said casing, an air inlet in said housing and said casing, means including a converging throat arranged to deliver air into said casing, a cooling air tank having an inlet adapted to be fed with air from said throat and an outlet through which the cooled air is adapted to pass, a plurality of tubes in said chamber and exposed to the refrigerant therein, a manifold having the inlet end of each tube operatively connected with it and arranged in registry with the outlet end of said tank, said tubes having outlet ends in registry with the outlet for cooled air, a cooled air reservoir tank within said cooling air tank, means arranged between said tanks to divert a part of the air stream passing through the discharge end of said cooling tank into said reservoir tank, and means for conducting air from said reservoir tank into the main air stream as it leaves said throat for re-entry into said cooling air tank, a bleed line having one end arranged to draw some of the cooled air from one of said tanks and to discharge the bled air into the main air stream prior to its entry into said throat.

8. The device of claim 7 wherein there is a cup in registry with said throat and the inlet opening of said housing, and detachably mounted means for delivering air under pressure into said cup for passage through the cooling device.

9. The device of claim 7 wherein at least one of said tanks has a corrugted wall to present a larger area to the air stream as it passes therethrough in order to have the air stream surrender its heat.

10. A portable air cooling apparatus for an enclosure such as a room or motor vehicle, said apparatus comprising means enclosing a refrigerant chamber which has an inlet and an outlet, a nozzle forming a throat which is in registry with said inlet, a cooling tank into which said nozzle discharges, a plurality of tubes operatively connecting said cooling tank with said outlet and located in said chamber in order to be exposed to the refrigerant therein, and means located between said tubes and said nozzle for recirculating a portion of the main air stream as said tubes are fed with the air from said nozzle and for delivering said portion of said air stream into said tubes.

References Cited in the file of this patent

UNITED STATES PATENTS

| | | |
|---|---|---|
| 774,811 | Witter | Nov. 15, 1904 |
| 1,171,387 | Dickson | Feb. 8, 1916 |